(12) United States Patent
Sreeram et al.

(10) Patent No.: US 6,361,390 B1
(45) Date of Patent: Mar. 26, 2002

(54) METHOD FOR MAKING AN EMBOSSED PLASMA DISPLAY BACK PANEL

(75) Inventors: Attiganal Narayanaswamy Sreeram, Plainsboro; Ashok Narayan Prabhu, East Windsor; Les Hozer, Lawrenceville; Kalipada Palit, Plainsboro, all of NJ (US)

(73) Assignee: Sarnoff Corporation, Princeton, NJ (US)

( * ) Notice: Subject to any disclaimer, the term of this patent is extended or adjusted under 35 U.S.C. 154(b) by 0 days.

(21) Appl. No.: 09/659,234

(22) Filed: Sep. 11, 2000

Related U.S. Application Data

(62) Division of application No. 09/127,425, filed on Jul. 31, 1998, now Pat. No. 6,140,759.
(60) Provisional application No. 60/093,987, filed on Jul. 24, 1998, and provisional application No. 60/093,157, filed on Jul. 17, 1998.

(51) Int. Cl.$^7$ .................................................. H01J 9/24
(52) U.S. Cl. ........................................ 445/24; 65/17.3
(58) Field of Search ............................. 445/24; 65/17.3

(56) References Cited

U.S. PATENT DOCUMENTS

| | | | | |
|---|---|---|---|---|
| 5,393,604 A | * | 2/1995 | Sanchez | 428/325 |
| 5,674,634 A | * | 10/1997 | Wang et al. | 428/688 |
| 5,853,446 A | * | 12/1998 | Carre et al. | 65/17.3 |
| 6,140,767 A | * | 10/2000 | Sreeram et al. | 313/582 |
| 6,168,490 B1 | * | 1/2001 | Hozer et al. | 445/24 |

* cited by examiner

Primary Examiner—Kenneth J. Ramsey
(74) Attorney, Agent, or Firm—William J. Burke

(57) ABSTRACT

A plasma display device of the type having a composite back plate including a metal substrate and a ceramic barrier rib structure, is formed using a green ceramic tape which is a combination of two glasses, a primary glass which flows back during firing and a secondary glass that has a relatively high thermal coefficient of expansion. These glasses are combined in proportion to match the thermal coefficient of expansion of the metal substrate. Channels are formed on the inner surface of the back panel by laminating a green ceramic tape to the metal substrate and then soaking the laminated tape in a solvent before embossing the green tape to form the ribs. This soaking step enhances the flow of the green ceramic tape during the embossing process. The ceramic components of the green tape are formulated with a particle size 15 μm or more to enhance particle flow when the green tape is embossed. Electrodes are printed onto one or more of the green ceramic tape layers, by screen printing using a metal emulsion screen, prior to embossing such that the electrode layer covers all or substantially all of the green tape layer and the electrodes are separated by the embossing process. Alternatively, the electrodes are printed onto one or more of the green ceramic tape layers using a conductive ink which may be applied using an ink-jet printing technique. In another alternative, the electrodes are formed from sheets of conductive material and applied to the back panel either before or after the panel is embossed.

26 Claims, 3 Drawing Sheets

METHOD FOR MAKING AN EMBOSSED PLASMA DISPLAY BACK PANEL

This application is a Divisional Application of U.S. patent application Ser. No. 09/127,425 filed Jul. 31, 1998, now U.S. Pat. No. 6,140,759 which claims priority of U.S. Provisional Application No. 60/093,987 filed Jul. 24, 1998, and also claims the priority of U. S. Provisional Application No. 60/093,157 entitled EMBOSSED PLASMA DISPLAY BACK PANEL filed on Jul. 17, 1998.

FIELD OF THE INVENTION

The present invention relates to a plasma display device and method of making the same, and, more particularly, to a plasma display in which the back panel is formed by laminating layers of dielectric material to a metal core, placing metal electrodes on or between the dielectric layers and embossing the laminated layers to form ribs on the back panel.

BACKGROUND OF THE INVENTION

A typical plasma display includes a front panel and a back panel both made of sheet glass (e.g. conventional float-glass). Electrical connections and mechanical structures are formed on one of both of the panels. For example, the back panel may have a ribbed structure formed on it such that the space between the ribs defines a pixel in a direct current (DC) display or column of pixels in an alternating current (AC) display. The ribs prevent optical cross-talk, that is to say, light from one pixel leaking into an adjacent pixel. Fabrication of these ribbed structures, called barrier ribs, poses a challenge both in the materials and manufacturing techniques that are used.

Plasma displays operate by selectively exciting an array of glow discharges in a confined rarefied noble gas. Full color displays are made by generating a glow discharge in a mixture of gases, such as He—Xe or Ne—Xe gas mixture to produce ultraviolet light. The ultraviolet light excites phosphors in the pixel cell, as defined by the barrier ribs, to produce light of desired color at the pixel position.

A typical plasma display back panel comprises a glass substrate having a plurality of substantially parallel, spaced first electrodes on a surface thereof. In AC displays, a thin layer of a dielectric material, such as a glass, typically covers the electrodes. Barrier ribs are formed on the surface of the glass substrate between the first electrodes. The barrier ribs project from the surface of the substrate at a distance greater than the thickness of the first electrodes. Red, green and blue (R-G-B) phosphor layers overlie alternating columns of the first electrodes in the spaces between the barriers and also overlie the walls of the barriers. A front transparent glass substrate, the front panel, overlies the rear panel and may rest on the barrier ribs so as to be spaced from the rear glass substrate by the barrier ribs.

Typically, the barrier ribs are walls which define troughs or channels on the back panel. Alternating current (AC) plasma displays typically have barriers that form the separators for the column pixels, and hence. have continuous vertical ribs on the back plate. By contrast, direct current (DC) plasma displays typically have ribbed barriers which isolate each pixel from all of its neighbors. Thus, for DC displays, the rib structure has a rectangular lattice-like layout. In either case, the desired resolution for the display device and its size determine the size of the ribbed barriers. In a typical display, the ribs are 0.1 to 0.2 mm in height, 0.03 to 0.2 mm wide and on a 0.1 to 1.0 mm pitch. For example, a barrier pitch of about 211 $\mu$m is desirable for the back panel of a 55 inch diagonal high-definition television (HDTV) display and a barrier height of about 161 $\mu$m is desirable for the back panel of a 42 inch diagonal HDTV display. These barrier ribs desirably have a height of less than 200 $\mu$m and a width of less than 60 $\mu$m.

Barrier ribs for plasma display devices having lower resolution may be formed separately from the back plate and attached using an adhesive or, as set forth in U.S. Pat. No. 5,674,634, entitled "INSULATOR COMPOSITION, GREEN TAPE, AND METHOD FOR FORMING PLASMA DISPLAY APPARATUS BARRIER RIB" to Wang et al. The barriers may also be formed on the back plate by laminating a ceramic green tape to a ceramic or glass back plate, sandblasting the green tape to form the channels between the barriers and then firing the back plate in a kiln to convert the green tape barriers into ceramic barriers.

Plasma display panels having lower resolution may also be formed by embossing a green ceramic tape as set forth in U.S. Pat. No. 5,747,931 entitled "PLASMA DISPLAY AND METHOD OF MAKING SAME" to Riddle et al. The plasma displays described in this patent are formed by embossing a laminated green ceramic tape and then bonding the embossed tape to a metal substrate.

The front panel of a plasma display device typically includes an array of substantially parallel, spaced second electrodes on its inner surface. These second electrodes extend substantially orthogonally to the first electrodes. A layer of a dielectric material, typically glass, covers the second electrodes. A layer of MgO covers the dielectric layer. Voltages applied to the electrodes in the proper manner excite, maintain and extinguish a plasma in the as within the region formed by the barriers. Addressing of individual pixels is done using external circuitry at the periphery of the panel. Barrier structures are typically used to confine the discharge to the addressed pixel, eliminating both electrical and optical cross talk between adjacent pixel elements. The columns of pixels are separated by the barriers, and the first electrodes are arranged beneath the gaps between the barriers. In a DC plasma display, the electrodes are not covered with glass or MgO, and the barrier structures are typically crossed, providing a box-like structure at each pixel element.

Although the structure and methods described above may be suitable for a low resolution plasma display they cannot easily be used to produce a high resolution display such as for a 42 inch or 55 inch HDTV display.

SUMMARY OF THE INVENTION

The present invention is embodied in a plasma display device of the type having a composite back plate including a metal substrate and a ceramic barrier rib structure, wherein the materials used to form the back plate have compatible thermal coefficients of expansion.

According to one aspect of the invention, the ceramic structure is formed using a green ceramic tape which is a combination of two glasses, a primary glass which flows back during firing and a secondary glass that has a relatively high thermal coefficient of expansion.

According to another aspect of the invention, channels are formed on the inner surface of the back panel by laminating a green ceramic tape to the metal substrate and then soaking the laminated tape in a solvent before embossing the green tape to form the ribs.

According to yet another aspect of the invention, the ceramic components of the green tape are formulated with a particle size 15 μm or more to enhance particle flow when the green tape is embossed.

According to another aspect of the invention, electrodes are printed onto one or more of the green ceramic tape layers, by screen printing using a metal emulsion screen, prior to embossing such that the electrode layer covers all or substantially all of the green tape layer and the electrodes are separated by the embossing process.

According to yet another aspect of the invention, the electrodes are printed onto one or more of the green ceramic tape layers using a conductive ink which may be applied using an inkjet printing technique.

According to yet another aspect of the invention, the electrodes are formed from sheets of conductive material and applied to the back panel either before or after the panel is embossed.

Figure 1:
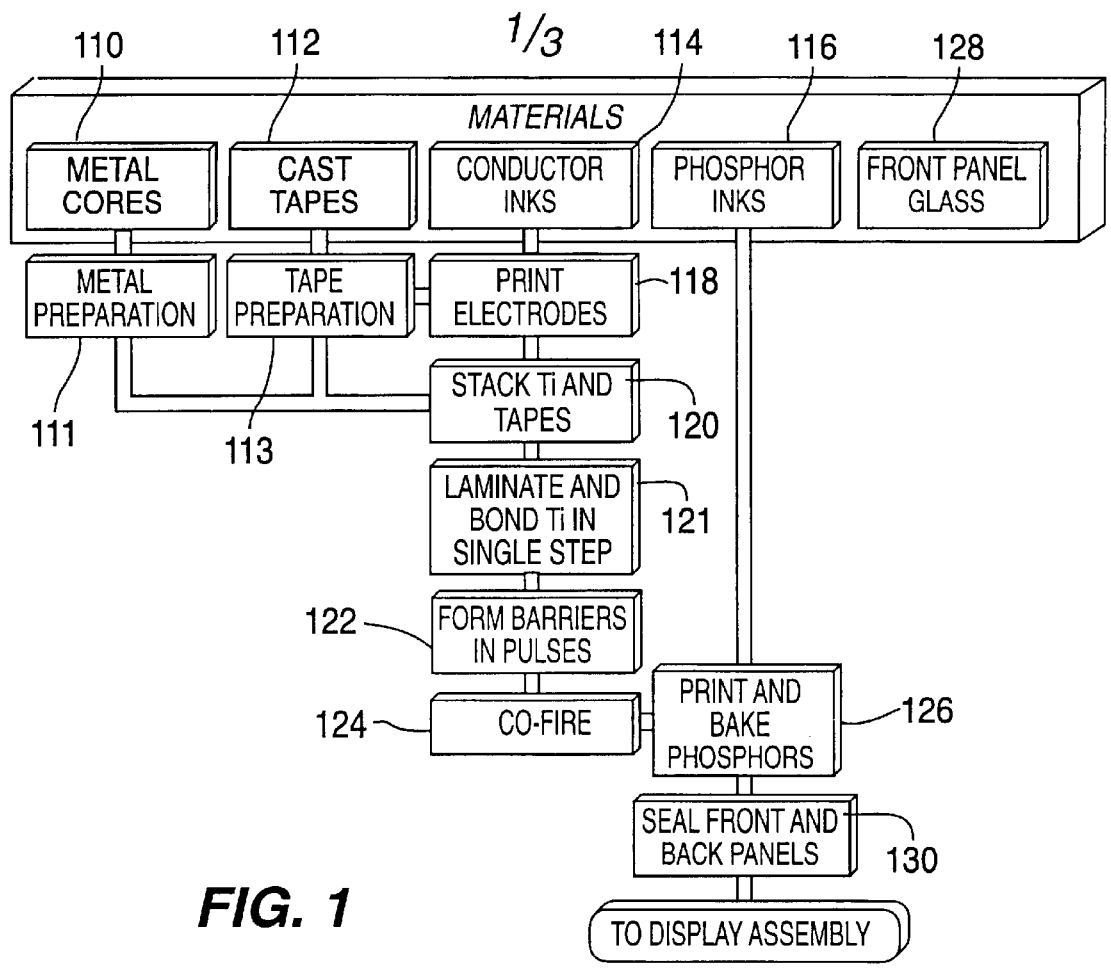
FIG. 1 is a flow chart showing the method of making the back panel of the present invention.

The entire disclosure of U.S. patent application No. 09/127,425 filed Jul. 31, 1998, is expressly incorporated by reference herein.

DETAILED DESCRIPTION

The invention will now be described with reference to specific embodiments selected for illustration in the drawings. It will be appreciated that the invention is not limited in spirit or scope to the embodiments illustrated and described below. Also, it will be appreciated that the drawings are not to scale or to proportion. Moreover, the drawings have been distorted to more clearly illustrate structures and methods which are used in the exemplary embodiments of the invention.

High resolution display devices having, for example 1280 horizontal pixels by 720 vertical pixels, and high definition television (HDTV) display devices having, for example, 1920 horizontal pixels by 1080 vertical pixels require a closer spacing of the barrier ribs and electrodes than can be reliably achieved by any of the described existing technologies, described above. A 40 inch diagonal high resolution display, for example, has a barrier pitch of 231 μm and a barrier width of 58 μm. A 42 inch diagonal HDTV display device has a barrier pitch of only 161 μm and a barrier width of 40 μm. The techniques described above may have difficulties in reliably producing barriers conforming to these specifications. In addition, it may be difficult to form electrodes on these panels without introducing unwanted short circuits.

To improve the processing of plasma displays, a type of plasma display has been developed wherein the back panel comprises a core plate of a metal and layers of a dielectric material extending over, and bonded to the core plate. On the surfaces of the dielectric layers and between the dielectric layers are metal strips forming the various electrodes. This back panel is made by forming thin green tape layers of a dielectric material and coating the surfaces of at least some of the green tape layers with metal strips or conductive ink that forms the electrodes. The green tape layers are laminated to the core plate, the laminated assembly is then embossed to form the barrier ribs and the assembly is fired at a temperature at which the green tape layers fuse together and bond to the core plate. The firing operation is done in ambient air; no specialty gasses are needed.

A plasma display according to the present invention includes a front panel made from glass, such as a float glass which has a thermal expansion coefficient of about $8.5 \times 10^{-6}/°$ C., it is desirable that the back panel have a thermal coefficient of expansion compatible with that of the front panel. This prevents disrupting the seal between the back panel and the front panel during the operation of the display. For a back panel which comprises a metal core plate having layers of a ceramic material bonded thereto, novel materials and a novel materials processing system are used to ensure that the back panel is compatible with the glass front panel. FIG. 1 shows the various steps used to form a back panel according to one embodiment of the present invention.

Briefly, the components of the plasma display are and a glass front panel 128 and a back panel including: a metal core 110, ceramic green tapes 112, conductor inks 114 and phosphor inks 116. In the exemplary embodiment of the invention, the metal core 110 of the back panel may be formed from metallic titanium. The ceramic green tape 112 is made as described below with reference to FIG. 2. The preparation of the conductor inks is also described below. The phosphor inks may be any of a number of commonly available preparations, such as those used for colored florescent lamps.

In the first step in the process, step 111, the metal core is prepared by applying a bonding glaze to the metal core to prepare it to be laminated to the green tape 112. The bonding glaze prevents oxidation of the titanium during the firing process and enables the mechanical locking of the glass-ceramics to the titanium metal. An exemplary bonding glaze is chemically compatible with both titanium and the glass-ceramics, exhibits a relatively low melting point and flows in the early stages of the firing process, thus limiting the exposure of the titanium to oxygen An exemplary glaze suitable for this purpose may be formed from a powder of Glass 1 (described below in Table 4).

Alternatively, a commercially available low-melting point lead-based glaze, for example, Homel F-92, may be applied to the surface of the metal core prior to lamination. Other alternative glazes may be formed by mixing three glasses (glass A, glass B and glass C, each described below). One exemplary glaze, glaze 1, is a mixture of glass A and glass B in a percent weight range of 35–65% glass A and 65–35% glass B with an exemplary mixture of 50% glass A and 50% glass B. Another exemplary glaze, glaze 2, may be formed by mixing glass B with glass C in a percent weight range of 35–65% glass B and 65–35% glass C with an exemplary mixture of 50% glass B and 50% glass C. Yet another exemplary glaze, glaze 3, may be formed by mixing glass A with glass C in a percent weight range of 10–50% glass A and 90–50% glass C with an exemplary mixture of 50% glass A and 50% glass C.

TABLE 1

| Component | Range % | Weight % |
|---|---|---|
| Glass A | | |
| PbO | 60.00–72.00 | 65.00 |
| $SiO_2$ | 28.00–35.00 | 32.00 |
| $Al_2O_3$ | 0.00–5.00 | 3.00 |
| Glass B | | |
| PbO | 75.00–86.50 | 80.00 |
| ZnO | 3.00–6.00 | 5.00 |
| $SnO_2$ | 0.50–2.00 | 0.80 |
| $Co_3O_4$ | 0.00–1.00 | 0.20 |
| $B_2O_3$ | 10.00–16.00 | 14.00 |
| Glass C | | |
| BaO | 21.00–28.00 | 25.60 |
| CaO | 4.00–7.00 | 6.20 |
| $SiO_2$ | 6.00–9.00 | 8.40 |
| $Bi_2O_3$ | 43.00–61.00 | 49.90 |
| $B_2O_3$ | 8.00–13.00 | 9.90 |

Other glaze formulations which produce good results are given in Table 2.

TABLE 2

| Component | Range % | Weight % |
|---|---|---|
| Glaze 4 | | |
| PbO | 54.00–82.00 | 65.00 |
| $SiO_2$ | 1.00–5.00 | 3.00 |
| CuO | 0.00–5.00 | 2.00 |
| $B_2O_3$ | 17.00–26.00 | 23.00 |
| ZnO | 0.00–15.00 | 7.00 |
| Glaze 5 | | |
| PbO | 42.00–80.00 | 60.00 |
| $SiO_2$ | 1.00–6.00 | 3.00 |
| CuO | 0.00–6.00 | 3.00 |
| $B_2O_3$ | 16.00–26.00 | 22.00 |
| BaO | 1.00–7.00 | 4.00 |
| $Al_2O_3$ | 0.00–5.00 | 2.00 |
| ZnO | 2.00–8.00 | 6.00 |
| Glaze 6 | | |
| PbO | 37.00–68.00 | 63.00 |
| $SiO_2$ | 1.00–6.00 | 3.00 |
| $B_2O_3$ | 16.00–26.00 | 18.00 |
| $Al_2O_3$ | 15.00–26.00 | 15.00 |
| ZnO | 0.00–5.00 | 1.00 |
| Glaze 7 | | |
| PbO | 49.00–75.00 | 69.00 |
| $SiO_2$ | 15.00–26.00 | 18.00 |
| $B_2O_3$ | 10.00–25.00 | 13.00 |

After the particle size of the component glasses have been processed to have a particle size of less than two microns, the glass is deposited by spraying a known amount, for example, 10 mg per square inch, of the glass powder suspension in an organic liquid, on the surface of the titanium substrate and then pre-flowing the coated substrate in a furnace at a controlled temperature, typically with a peak firing temperature of 550° C. The inventors have determined that this process typically results in a bonding strength that is greater than 100 psi and, so, is adequate to hold the titanium and the ceramic together during the fabrication and operation of the plasma display panel. In addition, the interface between the ceramic and the titanium is typically hermetic and needs no additional sealing to contain the plasma gas.

Next, at step 113, the cast green ceramic tapes are prepared. This step involves cutting blanks from the sheets of green tape prepared as described below with reference to FIG. 2. The next step in the process is step 118, in which the electrodes are printed on the green tape using the conductor inks, exemplary compositions of which are described below. The electrodes may be implemented on several layers of the green tape, as described below, and interconnected using vias through the green tape layers. Alternatively, the back panel may include a single green tape layer having only the column electrodes. These electrodes and vias allow the ceramic structure formed from the fired green tape to include the electrical connections between the pixel cells and the driving electronics, mounted, for example, along the edges of the display.

The next step in the process, step 120, is to stack the green tape blanks, which were prepared at step 113 onto the metal core 110. At step 121, the green tape blanks are laminated and bonded to the metal core in a single step. In the exemplary embodiment of the invention, because vias may be formed through at least some of the green tape layers during the preparation step 113, it may be desirable to precisely align the various green tape layers before they are laminated. In the exemplary embodiment of the invention, the ceramic green tape may be laminated using a pressure of approximately 40 Kg/cm$^2$ and a lamination temperature of approximately 90° C.

At step 122, the laminated green tape and metal core are embossed to form the barrier ribs in the green tape. This step is described in more detail below. At step 124, the laminated and embossed assembly is fired at a peak temperature of approximately 900° C. After the back panel has cooled, the phosphor stripes are printed between the column barrier ribs, at step 126, and the back panel is baked to affix the phosphors. The application of the phosphors and the baking used to affix them may use any of a number of conventional processes commonly used to affix phosphors, for example, to CRT screens. Finally, a fritz-glass seal is applied to the back panel. The front panel glass 128 is placed onto the back panel and the combined front and back panels are fired again to melt the fritz and seal the front panel to the back panel.

As described above, it is desirable for the thermal coefficient of expansion (TCE) of the metal core plate to be matched to that of the front panel. To this end, it is desirable to use soda-lime float glass (TCE about 8.5×10$^{-6}$/° C.) for the front panel because of its low cost. A metal with this TCE, or other arbiter value, can generally be synthesized by laminating of different metals, e.g., Cu—Mo—Cu In this laminate, the outer metal has a TCE that is different from the TCE of the inner metal. and the laminate takes on a TCE value intermediate between the two. The exact value depends on the relative thickness and other properties of the different layers. However, it is more convenient to chose an existing metal or alloy that meets the TCE requirement. One exemplary material is metallic titanium, which has a TCE of 8.5×10$^{-6}$/° C. Titanium is a rugged material, with the highest strength to weight ratio of any metal or metal alloy. Titanium is an abundant metal, readily available in very large sheet form, moreover, it is relatively inexpensive.

Figure 2:
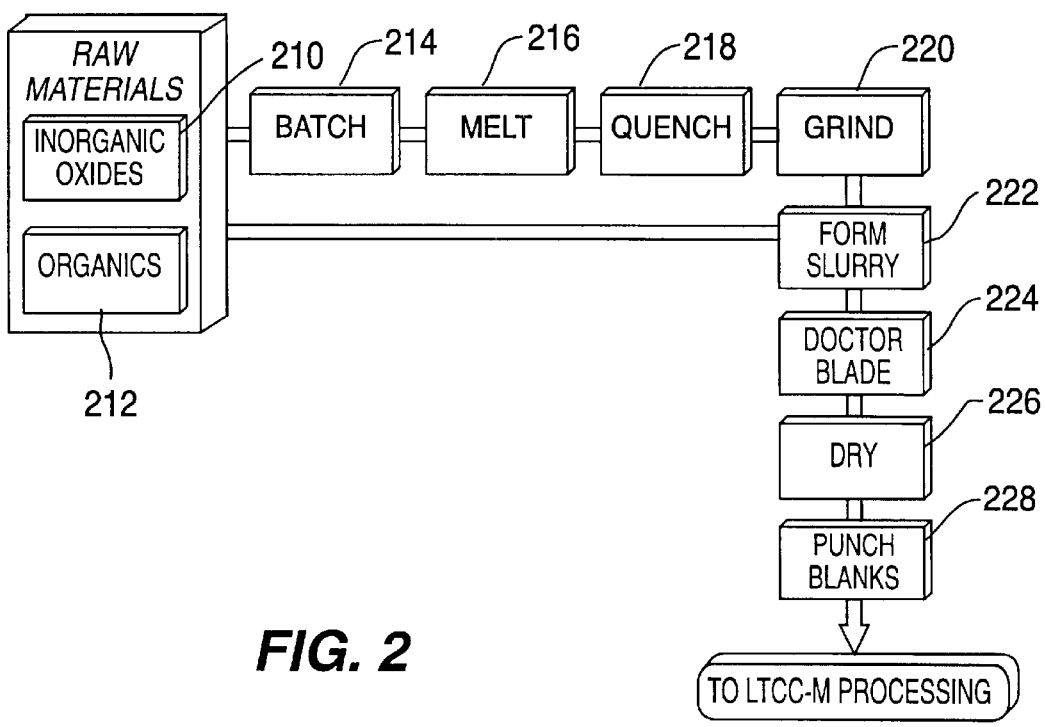
FIG. 2 is a flow chart showing the method of making the green tapes used in making the back panel of the display of the present invention.

Together with the metal core, the ceramic green tape is a chief inventory component of the back panel. As shown in FIG. 2, green tape fabrication beings with inorganic raw materials, such as MgO, $Al_2O_3$, $SiO_2$, $B_2O_3$, $P_2O_5$, PbO, ZnO, $TiO_2$ and various alkali, alkaline or heavy metal oxides or materials formed from them. The ingredients are mixed in a batch in proportions to achieve the desired properties. This batch is melted at 1400°–1700° C., and is quenched. The resulting glass is ground to form a powder. The glass powder is combined with organic binders, solvent, surfactants, and other modifier additives to form a slurry. The slurry is spread on a flat surface by a doctor blade process. The process of forming large sheets of ceramic tape is referred to as "casting". The cast tape formed by this process, including the glass powder, is easily stored in rolls.

The ingredients that constitute the tape, both the inorganic oxides and the various organic compounds, are selected to provide desired tape properties. For back panel formation, these tape properties include, the ability to be formed in large area casting, the ability to be embossed to form barrier ribs and the ability to maintain barrier shape during firing. Green ceramic tapes are commonly cast in sizes of one to two meters wide and several meters in length. For such large area casting, the organic binders may be formulated to provide high tear strength for handling during manufacturing. It is also desirable to ensure uniform tape thickness and homogeneity throughout the cast. The organic components may also be selected to promote uniform lamination at nominal pressures (10–10,000 Kg/cm$^2$).

The barrier ribs may be formed on the back panel by a single embossing step while the ceramic tape is in the green state, i.e., prior to firing. Proper embossing depends on a combination of plastic and visco-elastic flow properties of the laminate. These flow properties are controlled principally by the organic resins blended into the slurry used to prepare the tape, and on the particle size and distribution of the inorganic ceramic powders used in the slurry.

One method to enhance the material flow during embossing is to soak the dried green tape in organic solvents prior to embossing. The solvents decrease viscosity of the tape enabling material flow into the grooves of the die. Exemplary formulations for a solvent mixture suitable for soaking the laminated assembly are described below.

During firing, the organics that promote the barrier formation are quickly burned off The remaining ceramic powders melt and crystallize. The temperature of melting and of crystallization and the rate of crystallization vary from material to material. The ceramic tape composition described below provides desired melting and crystallization properties while also providing desirable properties in the final ceramic layers, including a thermal coefficient of expansion which matches that of the metallic core.

As the ceramic materials in the tape melt during the firing process, they tend to flow. Crystallization impedes this visco-elastic flow, and promotes solidification. To maintain the barrier shapes embossed into the green tape, the ceramic powder combination desirably has a crystallization temperature just lightly above the softening point (750–850° C. for the green tape composition described below with reference to Table 3). Tis allows the material to become more dense at the softening point, and to flow sufficiently to develop a smooth surface. The rapid crystallization, however, causes the glass to maintain the shape and form of the barriers that were fabricated when the tape was embossed or scribed in its green state.

The thermal coefficient of expansion (TCE) of the final ceramic is controlled by combining glasses with TCEs above and below the desired value. The ratio of these constituent glasses is adjusted to obtain the desired TCE. Control of TCE is important to minimize stresses in the final panel and assure panel flatness after cooling. A percent weight formulation which produces a ceramic tape having a thermal coefficient of expansion compatible with that of the titanium core and the float glass front panel and having the other desired properties for a ceramic tape is shown in Table 3.

TABLE 3

| Glass 1 | 99.50–60.00 |
|---|---|
| Glass 2 | 0.50–40.00 |

Glass 1 is a $B_2O_3$—ZnO—MgO—$SiO_2$ glass melted separately at 1550° C. for approximately 2 hours and rapidly quenched to form glass which is subsequently ground to a powder using a standard commutation processes. The formulation range of Glass 1 and an exemplary specific formulation are shown in Table 4:

TABLE 4

| | Glass 1 | |
|---|---|---|
| | Range | Specific |
| ZnO | 15.00–50.00 | 30.00 |
| MgO | 10.00–45.00 | 25.00 |
| BaO | 5.00–30.00 | 20.00 |
| $SiO_2$ | 10.00–45.00 | 25.00 |

Glass 2 may be, for example, Mg-Al-boro-phosphosilicate glass, calcium silicate glass, calcium borate glass or a Ba-M-borosilicate glass, where "M" is one or more of a metal such as Mg, Al, Ca, etc. which is mixed with the other components of the glass in a proportion of 0 to 60 percent weight It is contemplated that fillers such as fluorspar, sillimanite, spinel, or alumina may also be added. A formulation range for an exemplary Glass 2 and two exemplary specific formulations for the glass are shown in Table 5:

TABLE 5

| | Glass 2 | | |
|---|---|---|---|
| | Range | Specific 1 | Specific 2 |
| $SiO_2$ | 10.00–80.00 | 19.53 | 16.12 |
| $B_2O_3$ | 5.00–60.00 | 17.16 | 6.05 |
| BaO | 5.00–30.00 | 63.31 | 68.76 |
| $Al_2O_3$ | 0.00–60.00 | 0.00 | 9.07 |

The glass composition set forth in table 3 may be mixed with organic solvents in the proportion shown in Table 6 to produce a suitable green tape.

TABLE 6

| Glass composition (Table 3) | 70.30 |
|---|---|
| Solvent 1 | 13.80 |
| Resin 1 | 15.90 |

Alternatively, glass 1, ground to a particle size of approximately 10 µm, may be mixed with glass 2, ground to a particle size of approximately 6.5 µm, and the solvents in the proportion range shown in Table 7 or in the specific proportion shown in Table 8 to produce a suitable green tape.

TABLE 7

| Glass 1 | 40.00–70.00 |
|---|---|
| Glass 2 | 1.00–15.00 |
| Solvent 1 | 10.00–30.00 |
| Resin 1 | 10.00–40.00 |

TABLE 8

| | |
|---|---|
| Glass 1 | 58.82 |
| Glass 2 | 6.54 |
| Solvent 1 | 16.34 |
| Resin 1 | 18.30 |

Exemplary formulations for Solvent 1 and Resin 1 are given in Tables 9 and 10 below.

TABLE 9

| Solvent 1 | |
|---|---|
| Methyl-ethyl-ketone | 46.90 |
| Ethanol | 46.90 |
| Fish oil | 6.20 |

TABLE 10

| Resin 1 | |
|---|---|
| Methyl-ethyl-ketone | 36.00 |
| Ethanol | 36.00 |
| Monosanto #160 plasticizer | 11.20 |
| Monsanto B-98 resin | 16.80 |

An alternative solvent or resin, Solvent 2 and Resin 2, may be used in place of one or both of the Solvent 1 and Resin 1. Percent-weight formulations for these alternative solvent and resin are given in tables 11 and 12.

TABLE 11

| Solvent 2 | |
|---|---|
| Methyl-ethyl-ketone | 48.10 |
| Ethanol | 48.10 |
| Hypermer PS-2 | 3.80 |

TABLE 12

| Resin 2 | |
|---|---|
| Methyl-ethyl-ketone | 36.00 |
| Ethanol | 36.00 |
| Monosanto #160 plasticizer | 11.20 |
| Monsanto B-79 resin | 16.80 |

Resin 2 has a lower viscosity than Resin 1 due to the use of the B-79 resin in place of the B-98 resin. This decrease in viscosity may facilitate barrier formation by allowing the embossed tape to flow more easily into the embossing die. In general, a resin of low viscosity and low glass temperature may be used to reduce the viscosity of the green tape. In the above example, the glass transition temperature of the B-79 resin is 62° C. to 72° C. while the glass transition temperature of the B-98 resin is 72° C. to 78° C. In addition, further a reduction in viscosity may be realized by adding a surfactant such as L7602. Exemplary green tape formulations which include resin 2 in place of resin 1 are given in tables 13 and 14. Exemplary formulations which include resin 2 and the surfactant are given in tables 15 and 16.

TABLE 13

| | |
|---|---|
| Glass 1 | 40.00–70.00 |
| Glass 2 | 1.00–15.00 |
| Solvent 1 | 10.00–30.00 |
| Resin 2 | 10.00–40.00 |

TABLE 14

| | |
|---|---|
| Glass 1 | 58.82 |
| Glass 2 | 6.54 |
| Solvent 1 | 16.34 |
| Resin 2 | 18.30 |

TABLE 15

| | |
|---|---|
| Glass 1 | 40.00–70.00 |
| Glass 2 | 1.00–15.00 |
| Solvent 1 | 10.00–30.00 |
| Resin 2 | 10.00–40.00 |
| Surfactant | 0.50–5.00 |

TABLE 16

| | |
|---|---|
| Glass 1 | 57.51 |
| Glass 2 | 6.39 |
| Solvent 1 | 15.97 |
| Resin 2 | 17.89 |
| Surfactant | 2.24 |

The above materials are combined in order to cast a tape which produces dense glass-ceramics after firing at peak temperatures 700° C.–1000° C. range. The fired materials exhibit relatively low dielectric constants (i.e. on the order of 5 to 10), and exhibit near-zero shrinkage during LTCC-M processing.

The process for forming the ceramic green tape is shown in FIG. 2. This process begins with the raw materials. As described above Glass 1 and, optionally, Glass 2, are separately prepared by mixing (step 214) respective batches, melting (step 216) the batches at the temperatures and for the times described above, quenching (step 218) the molten mixture to form a glass and grinding the glass to form a powder. In the exemplary embodiment of the invention, the glasses Glass I and Glass 2 are ground to have a particle size of approximately 6–12 $\mu$m. The inventors have determined, however, that a formulation with a larger particle size, approximately 15 $\mu$m results in a better flow of the tape into the grooves of the embossing die. Alternatively, the molten glass may be spray-dried resulting in monodispersed globules (5–40 $\mu$m in diameter) which may be used for green tape fabrication to enhance flow during embossing.

Next, at step 222, the ground glasses and fillers are combined with the organics in the proportions shown in Table 6 to form a slurry. For this step, the glass powder mixture is thoroughly mixed first with the solvent and then with the resin and, optionally the surfactant. The slurry mixture is then milled, also in step 222, by placing the slurry in, for example, a one liter milling jar containing 150 ml 3/8"ZrO$_2$ rollers and placing the jar on a roll mill for at least two hours. The slurry is then strained into a container to remove the rollers and de-aired for one minute while stirring. Incomplete de-airing results in pinholes or small bubbles in the cast tape. Excessive de-airing results in the removal of too much of the solvent, which results in a slurry which is too viscous.

This slurry is formed into sheets at step 224 using a doctor blade process. The first step in this process is to measure the viscosity of the de-aired slurry. A typical viscosity is between 700 and 1100 cps. Next, a 3-mil mylar sheet is prepared by applying a silicon release agent to the top surface of the sheet. Next, the doctor blade is adjusted to obtain the desired thickness of the tape. A blade opening of 15 mils is used to obtain a green tape thickness of 8 mils. The slurry is then poured into the tape caster. Initially, the mylar is pulled at a speed of 20 cm/min until the slurry appears at the output area of the tape caster. Then the pull speed is increased to 90 cm/min. Because of the abrasive properties of the slurry, the doctor blade and the tape casting head may periodically need to be reground or replaced. At step 226, the sheets are dried for at least 30 minutes before being removed from the tape caster. As a quality control step, the cast tape is viewed on a light box for imperfections and the thickness and density of the tape are measured at several points along the cast tape. At step 228, the green tape is punched to prepare blanks which may have conductor paste and fill paste applied to them to form electrodes and interconnecting circuitry, at step 118 of FIG. 1, before being laminated, at step 120, to the metal core.

Figure 3:
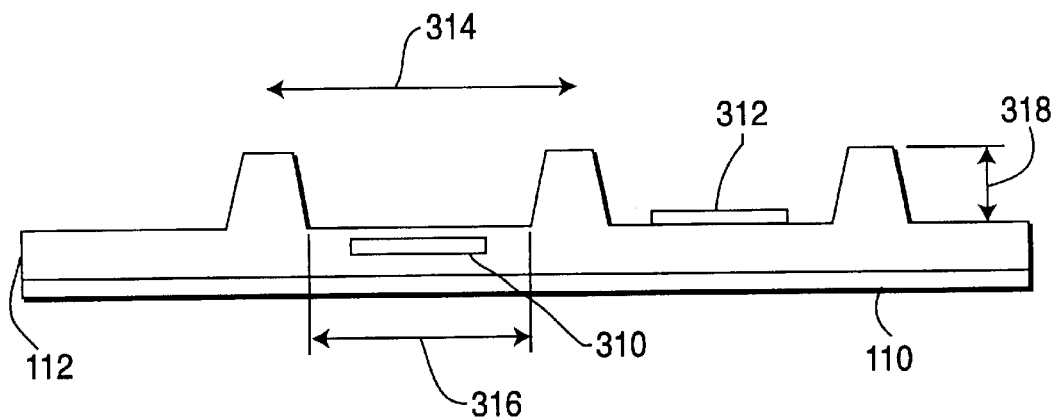
FIG. 3 is an cut-away side plan view of an embossed back panel according to the present invention.

FIG. 3 is a cut-away view of an embossed back panel including the metal core 110 and green tape 112. The back panels electrodes can be placed alternatively in one of the two locations shown in FIG. 3. Also shown in FIG. 3 are exemplary measurements for the pitch 314, channel width 316 and barrier height 318.

The electrode at position 310 is a buried electrode while the electrode at position 312 is a surface electrode. The back panel electrodes used in plasma display devices are narrow lines having a size which depends on the pitch or spacing between adjacent columns and the width of the channel in which the electrode is deposited. In general, the channel width of a plasma display device does not exceed 150 $\mu$m. It is desirable for the electrodes to be placed entirely within the channel. The buried electrode location 310 is usually preferred since the electrode is beneath a thin layer of insulator, thus not is not chemically affected by the phosphors either during the manufacture of the back panel or during the operation of the display device. In addition, during the operation of the device, the electrode is not in contact with the plasmas used to induce florescence in the phosphors. Several methods are proposed of formation of the electrodes.

One approach to forming the electrodes is to, screen-print the electrodes onto the green tape using specially designed inks or pastes, such as nano-particulate suspensions of silver, or related silver solutions. To improve screen dimensional tolerances metal emulsion screens, such as are available from UTZ company, may be used, which exhibit superior dimensional stability compared conventional polymer emulsion.

The percent weight composition of a suitable conductor ink using a nano-particulate suspension of silver is set forth in Tables 17, 18 and 19.

TABLE 17

| Conductor Ink | |
| --- | --- |
| Ag Powder (~0.1 $\mu$m) | 63.40–57.30 |
| Metz Cu-10 | 0.40–0.60 |
| Resin 3 | 34.00–39.00 |
| 50% Lecithin/50% Terpineol | 2.20–3.10 |

TABLE 18

| Conductor Ink | |
| --- | --- |
| Ag Powder (~0.1 $\mu$m) | 60.48 |
| MetzCu-10 | 0.51 |
| Resin 3 | 36.29 |
| 50% Lecithin/50% Terpineol | 2.72 |

TABLE 19

| | |
| --- | --- |
| Ethyl cellulose N-300 | 3.76 |
| Ethyl cellulose N-14 | 7.52 |
| Butyl carbitol | 53.22 |
| Dodecanol | 35.50 |

The percent weight composition of a suitable conductor ink using a related silver is set forth in Tables 21 and 22.

TABLE 21

| Conductor Ink | |
| --- | --- |
| Ag Powder "EG"(~7.6 $\mu$m) | 40.00–60.00 |
| Ag Resinate | 1.00–10.00 |
| Metz Cu-10 | 0.10–2.00 |
| VC-108 | 25.00–55.00 |
| 50% Lecithin/50% Terpineol | 1.00–5.00 |

TABLE 22

| Conductor Ink | |
| --- | --- |
| Ag Powder "EG"(~7.6 $\mu$m) | 55.44 |
| Ag Resinate | 5.04 |
| Metz Cu-10 | 0.51 |
| VC-108 | 36.29 |
| 50% Lecithin/50% Terpineol | 2.72 |

One of ordinary skill in the art would know that Met Cu-10 is elemental copper having a particle size of approximately 2.3 $\mu$m, that Ethyl cellulose N-300 is Ethyl cellulose having a viscosity of 300 centipoise and that Ethyl cellulose N-14 is Ethyl cellulose having a viscosity of 14 centipoise.

Figure 4:
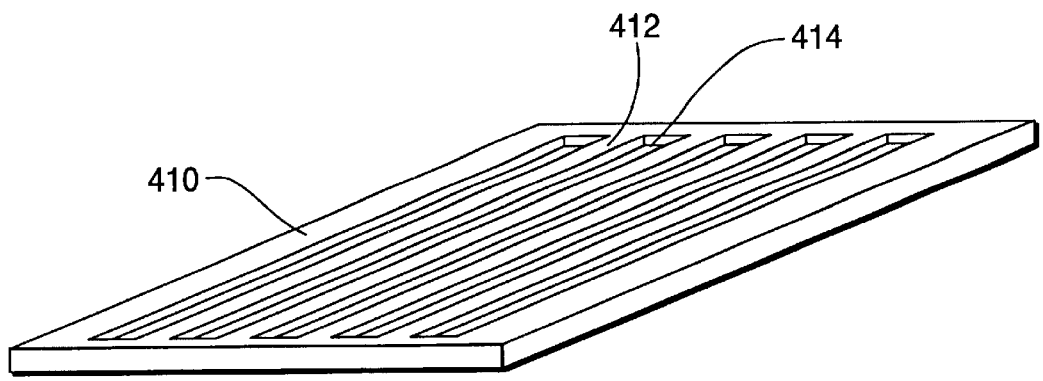
FIG. 4 is an isometric view of an electrode structure formed from a conductive foil.

Either of these conductor inks may be screen-printed onto the green tape prior to the barrier formation process. The inventors have determined that these ink formulations withstand the barrier formation processes, particularly the high pressures, without breaking any conductor traces while maintaining good electrical conductivity. Another approach to forming the back panel electrodes uses prefabricated silver foil electrodes as shown in FIG. 4. The exemplary electrode structure uses silver foil 410 which is greater than 95% pure and has a thickness of approximately one mil. Slots 414 in silver foil can be prefabricated by chemical etching or mechanical punching. The sliver foil 412 remaining between the slots 414 forms the electrodes. Such a fabricated electrode preform can be laminated to a green ceramic tape blank and optionally covered with an insulating layer prior to barrier formation Alternatively, the foil electrode preform may be placed within the channels of previously formed and fired back panel. In the latter case the entire back-panel may be covered with a thin layer of insulator, e.g. by spraying the back panel with one of the glass formulations described above and post-firing, or by a thin-film deposition process.

In yet another approach (not shown), a desired diameter wire may be wound into a framework of electrodes and placed within channels of previously formed and fired barriers. In this case, the entire back-panel may be covered with a thin layer of insulator, for example, by spraying the back panel with one of the glass formulations described above and post-firing, or by a thin-film deposition process. The exposed ends of the wires may then be covered with solder paste to connect them to the co-fired input/output (I/O) pads. In this exemplary embodiment, the bond between the wires and the I/O pads is formed by a solder reflowing step. After the wires have been bonded to the I/O pads, excess silver may be sheared off.

In yet another approach (not shown), the electrodes may be deposited within channels of formed barriers (before or after firing) by means of ink-jet printing. In this instance, the inks may be confined with the back panel or they may be post-fired after deposition onto a previously fleed panel. One advantage of ink-jet printing is that it may provide better resolution than screen printing. An exemplary conductive ink which is suitable for use in forming the electrodes using ink-jet printing is shown in tables 23 and 24.

TABLE 23

Ink-Jet Conductor Ink

| | |
|---|---|
| Ag Powder "EG" (~7.6 μm) | 12.765–0.135 |
| Metz Cu-10 | 0.035–0.065 |
| VC-108 | 80.00–91.00 |
| 50% Lecithin/50% Terpineol | 7.20–8.80 |

TABLE 24

Ink-Jet Conductor Ink

| | |
|---|---|
| Ag Powder (~0.1 μm) | 5.40 |
| Metz Cu-10 | 0.05 |
| Resin 3 | 86.45 |
| 50% Lecithin/50% Terpineol | 8.10 |

A final method for forming electrodes on a ceramic back panel is to print the electrodes onto the green-tape blanks, prior to embossing, and use the barrier formation process to separate the electrodes and to align the electrodes with the channels.

Figure 5:
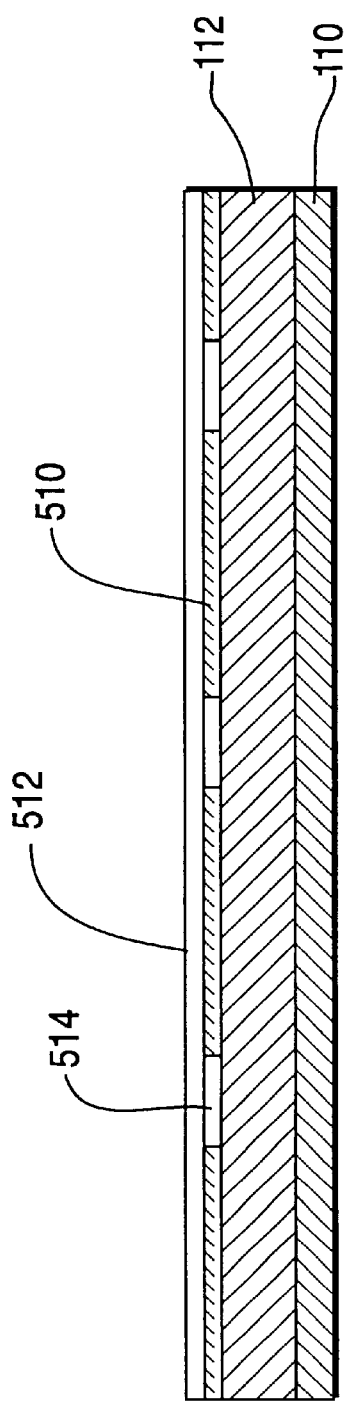
FIG. 5 is a cut-away side plan view of a laminated green-tape and ceramic structure according to one aspect of the present invention.

According to this method, a basic LTCC-M green structure is prepared as described above. An exemplary structure is shown in FIG. 5. This structure includes a green ceramic blank 112 on metal sheet 110. Electrodes 510, which are considerably wider than the channel, are then screen printed on the ceramic blank. These electrodes may be printed, for example, using existing screen printing apparatus. The openings 514 between lines are smaller than the electrode width. Using this method, it is not necessary to ensure that there are no short circuits between the electrodes during the printing process. Furthermore, it is contemplated that the electrode material may form even a continuous blanket coat within the display active area.

Figure 6:
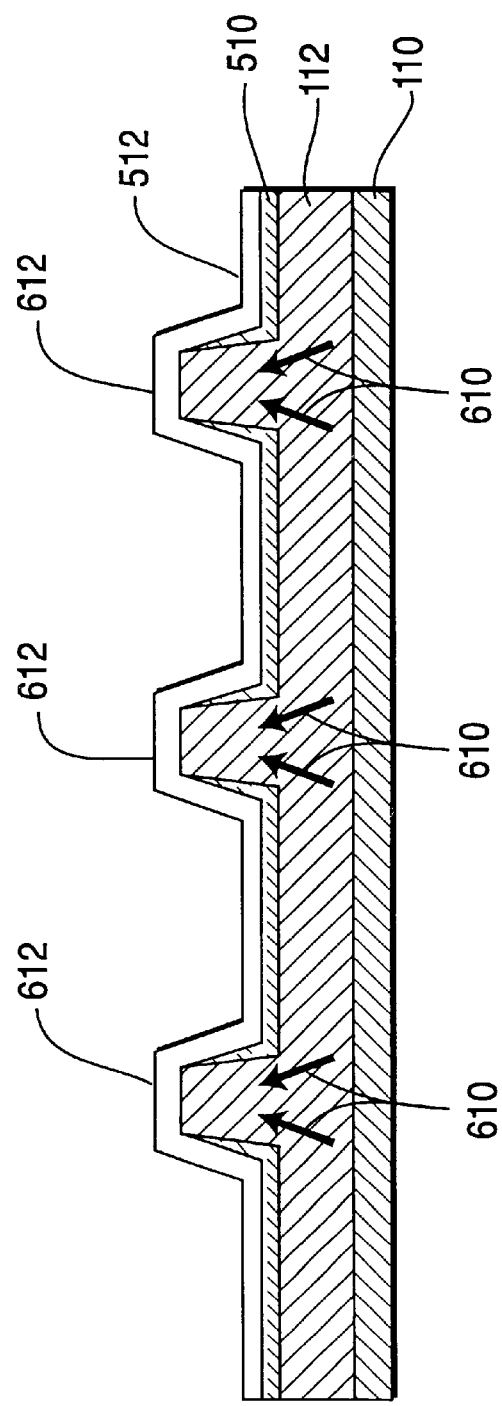
FIG. 6 is a cut-away side-plan view of the laminated structure shown in FIG. 5, after the embossing step.

The next step in the process is to coat the entire structure with blanket coat of dielectric material (e.g. one of the glass formulations described above) for example by screen-printing. Subsequently, the green back-panel is embossed to form desired barriers, as shown in FIG. 6. Since barrier formation process involves visoelastic flow of the green ceramic material 112 from between and underneath the electrodes upwards, as indicated by the arrows 610, it acts to separate the electrode material 510 which extends across the barriers 612, leaving the remaining electrode material positioned exactly within the channels.

It may be desirable to adjust the composition of the conductor ink order to enhance the separation. An organic component that is brittle at the embossing temperature, for example Elvacite in Terpineol, may be added to the ink. Exemplary formulations for conductor inks suitable for use in this embodiment of the invention are given in tables 25 and 26.

TABLE 25

Conductor Ink with brittle resin

| | |
|---|---|
| Ag Powder "EG" (~7.6 μm) | 87.00–84.30 |
| Metz Cu-10 | 0.50–0.80 |
| 15% Elvacite 2045 in Terpineol | 11.50–13.50 |
| 50% Lecithin/50% Terpineol | 1.00–1.40 |

TABLE 26

Conductor Ink with brittle resin

| | |
|---|---|
| Ag Powder (~0.1 μm) | 85.23 |
| Metz Cu-10 | 0.71 |
| 15% Elvacite 2045 in Terpineol | 12.78 |
| 50% Lecithin/50% Terpineol | 1.28 | where Elvacite 2045 is the tradename for Isobutyl methacrylate manufactured by DuPont.

An embossed structure made according to the process described above is ready for firing. The topcoat dielectric material 512. as shown in FIG. 6, is not separated during embossing because this material is not brittle at embossing temperatures. In this regard, it may be desirable to combine this process with the process described below in which the green tape is soaked in solvent prior to being embossed. This soaking improves the flow of the green tape formulation, allowing the material 112 to flow more easily to form the barriers and also enhances the flexibility of the topcoat dielectric material 512, allowing it to remain unbroken through the embossing process.

One advantage of this method of forming electrodes is that the alignment of the embossing die to the electrode pattern is technically easier due to wider electrode lines. The alignment may be further improved by matching the printing screen to the embossing die.

The process described above may be used, for example, to make a 42" diagonal HDTV back panel which, as described above, desirably has a barrier pitch of approximately 161 μm. The electrodes for this display may be screen-printed at a width of approximately 125 μm. Because the pitch is only 161 μm, the spacing between electrodes is only 36 μm. At this spacing, it is possible that there will be unintentional connections (i.e. shorts) between adjacent electrodes. Even if there are some shorts, however, this method of forming the electrodes ensures that no shorts exist after the embossing and co-firing steps since the electrodes are further separated during embossing. Similar geometrical constraints exist for 30" diagonal XSVGA panel which has a pitch of approximately 165 μm pitch. For a panel of this type, electrode lines that are 125 μm wide electrode lines can be printed. As stated above the printing width of electrodes can be extended up to extreme case of full blanket coat.

In the example cases described above the electrode material, e.g., silver, surface coverage is of the order of 75–80%. This is greater than the approximately 50% coverage that would be used for conventional electrode deposition, (e.g. 80 μm lines, 80 μm spacing). While this technique may result in higher material costs, these costs should be well compensated by the increase in yield resulting from the use of the process.

As described above, one method to enhance the flow of material during embossing is to soak the dried green tape in organic solvents. The solvents decrease viscosity of the tape enabling material flow into the grooves of the die. The tape may be soaked uniformly, for example, by applying the solvent to the laminated structure with screen-printing apparatus. It is contemplated that the soaking mixture may contain some solid content which may serve as a coloring agent. It is well known in display technology that a black background beneath the red, green and blue phosphors enhances contrast in displayed images. This aspect of display technology may be implemented in a relatively straightforward manner by adding a black coloring agent, such as cobalt oxide (CoO) or CERDEC pigment 9585 to the soaking agent. Solids in the soaking agent may also be used to adjust the electrical resistance of the surface of the tape.

Exemplary solvents which may be used to soak the surface of the laminated green tape prior to embossing include resin 3 (VC- 108), described above with reference to Table 19, a 50/50 wt. % Lecithin in Terpineol, dodecanol or a mixture thereof. One exemplary mixture is 5% to 9% Terpineol and preferably 7% Terpineol with the balance being Resin 3. Another exemplary mixture is 7% to 12% dodecanol and preferably 10%, with the balance being Resin 3. In order to prevent drying shrinkage it is desirable to co-laminate the tape to the metal prior to soaking.

Even if this technology is not used, a black coloring agent, such as cobalt oxide (CoO) or CERDEC pigment 9585 may be added to the formulation of the top layer of the tape or sprayed or screen printed onto the top layer of the tape either before or after the co-firing of the panel at step 124 (shown in FIG. 1) but before the application of the phosphors at step 126.

The invention claimed is:

1. A method of forming a back panel for a plasma display device, the back panel including a metal core having a predetermined thermal coefficient of expansion (TCE) and a ceramic barrier rib structure comprising the steps of:

preparing a green ceramic tape for a ceramic which has a thermal coefficient of expansion (TCE) which matches the TCE of the metal core;

preparing the metal core to bond to the green ceramic tape;

laminating the green ceramic tape to the metal core;

soaking the laminated green ceramic tape in a solvent;

embossing the green ceramic tape to form the barrier ribs;

cofiring the bonded and embossed green ceramic tape and metal core to form the back panel.

2. A method according to claim 1, further including the step of preparing the solvent, wherein the solvent has a formulation defined by percent weight as:

| | |
|---|---|
| Ethyl cellulose (300 centipoise) | 3.76 |
| Ethyl cellulose (14 centipoise) | 7.52 |
| Butyl carbitol | 53.22 |
| Dodecanol | 35.50. |

3. A method according to claim 1, wherein the solvent is a 50/50 weight percent combination of Lecithin in Terpineol and dodecanol.

4. A method according to claim 1, further including the step of preparing the solvent, wherein the solvent has a formulation defined by percent weight as:

| | |
|---|---|
| Terpineol | 5.00–9.00 |
| Resin | 95.00–99.00; | wherein the resin is defined by percent weight as:

| | |
|---|---|
| Ethyl cellulose (300 centipoise) | 3.76 |
| Ethyl cellulose (14 centipoise) | 7.52 |
| Butyl carbitol | 53.22 |
| Dodecanol | 35.50. |

5. A method according to claim 1, further including the step of adding a coloring agent to the solvent.

6. A method according to claim 1, wherein the step of preparing the metal core to bond the ceramic tape includes the steps of:

coating the metal core with a glaze in an amount of approximately 10 mg per square inch; and heating the coated metal core in a furnace at a temperature sufficient to cause the glaze to flow.

7. A method according to claim 6, wherein the glaze is selected from a group consisting of: a) a mixture of between 35 and 65 percent weight glass A and between 65 and 35 percent weight glass B; b) a mixture of between 35 and 65 percent weight glass B and between 65 and 35 percent weight glass C; and c) between 10 and 50 percent weight glass A and between 50 and 90 percent weight glass C; and wherein:

glass A has a formulation defined by percent weight as:

| | |
|---|---|
| PbO | 60.00–72.00 |
| SiO$_2$ | 28.00–35.00 |
| Al$_2$O$_3$ | 0.00–5.00; | glass B has a formulation defined by percent weight as:

| | |
|---|---|
| PbO | 75.00–86.50 |
| ZnO | 3.00–6.00 |
| SnO$_2$ | 0.50–2.00 |
| Co$_3$O$_4$ | 0.00–1.00 |
| B$_2$O$_3$ | 10.00–16.00; and | glass C has a formulation defined by percent weight as:

| | |
|---|---|
| BaO | 21.00–28.00 |
| CaO | 4.00–7.00 |
| SiO2 | 6.00–9.00 |
| $Bi_2O_3$ | 43.00–61.00 |
| $B_2O_3$ | 8.00–13.00. |

8. A method according to claim 7, wherein the glaze is selected from a group consisting of: a) a mixture of 50 percent weight glass A and 50 percent weight glass B; b) a mixture of 50 percent weight glass B and 50 percent weight glass C; and c) a mixture of 50 percent weight glass A and 50 percent weight glass C; and wherein:

glass A has a formulation defined by percent weight as:

| | |
|---|---|
| PbO | 65.00 |
| $SiO_2$ | 32.00 |
| $Al_2O_3$ | 3.00 | glass B has a formulation defined by percent weight as:

| | |
|---|---|
| PbO | 80.00 |
| ZnO | 5.00 |
| $SnO_2$ | 0.80 |
| $Co_3O_4$ | 0.20 |
| $B_2O_3$ | 14.00 | glass C has a formulation defined by percent weight as:

| | |
|---|---|
| BaO | 25.60 |
| CaO | 6.20 |
| $SiO_2$ | 8.40 |
| $Bi_2O_3$ | 49.90 |
| $B_2O_3$ | 9.90. |

9. A method according to claim 6, wherein the glaze has a formulation defined by percent weight as:

| | |
|---|---|
| PbO | 54.00–82.00 |
| $SiO_2$ | 1.00–5.00 |
| CuO | 0.00–5.00 |
| $B_2O_3$ | 17.00–26.00 |
| ZnO | 0.00–15.00. |

10. A method according to claim 6, wherein the glaze has a formulation defined by percent weight as:

| | |
|---|---|
| PbO | 42.00–80.00 |
| $SiO_2$ | 1.00–6.00 |
| CuO | 0.00–6.00 |
| $B_2O_3$ | 16.00–26.00 |
| BaO | 1.00–7.00 |
| $Al_2O_3$ | 0.00–5.00 |
| ZnO | 2.00–8.00. |

11. A method according to claim 6, wherein the glaze has a formulation defined by percent weight as:

| | |
|---|---|
| PbO | 37.00–68.00 |
| $SiO_2$ | 1.00–6.00 |
| $B_2O_3$ | 16.00–26.00 |
| $Al_2O_3$ | 15.00–26.00 |
| ZnO | 0.00–5.00. |

12. A method according to claim 6, wherein the glaze has a formulation defined by percent weight as:

| | |
|---|---|
| PbO | 49.00–75.00 |
| $SiO_2$ | 15.00–26.00 |
| $B_2O_3$ | 10.00–25.00. |

13. A method according to claim 1 further including the step of printing electrode structures onto the green ceramic tape before laminating the green ceramic tape to the metal core.

14. A method according to claim 12, wherein the electrode structures are printed onto the green ceramic tape using a conductive ink which includes powered silver having an average particle size of approximately 0.1 μm (~0.1 μm), and the method further comprises the step of preparing the conductive ink having a formulation defined by percent weight as:

| | |
|---|---|
| Ag Powder (~0.1 μm) | 63.40–57.30 |
| Cu Powder (~2.3 μm) | 0.40–0.60 |
| resin | 34.00–39.00 |
| 50% Lecithin/50% Terpineol | 2.20–3.10. |

15. A method according to claim 13, further comprising the step of preparing the resin, wherein the resin has a formulation defined by percent weight as:

| | |
|---|---|
| Ethyl cellulose (300 centipoise) | 3.76 |
| Ethyl cellulose (14 centipoise) | 7.52 |
| Butyl carbitol | 53.22 |
| Dodecanol | 35.50. |

16. A method according to claim 13, wherein the electrodes are printed onto the green ceramic tape by screen printing using a metal emulsion screen.

17. A method according to claim 12, wherein the electrode structures are printed on to the green ceramic tape using a conductive ink, and the method further comprises the step of preparing the conductive ink having a formulation defined by percent weight as:

| | |
|---|---|
| Ag Powder (particle size approximately 7.6 μm (~7.6 μm)) | 40.00–60.00 |
| Ag Resinate | 1.00–10.00 |
| Cu Powder (~2.3 μm) | 0.10–2.00 |
| resin | 25.00–55.00 |
| 50% Lecithin/50% Terpineol | 1.00–5.00. |

18. A method according to claim 1, further including the step of printing electrode structures on to the back plate by applying a conductive ink using an ink-jet printing technique, wherein the conductive ink has a formulation defined by percent weight as:

| | |
|---|---|
| Ag Powder (particle size approximately 7.6 μm (~7.6 μm)) | 12.765–0.135 |
| Cu Powder (~2.3 μm) | 0.035–0.065 |
| resin | 80.00–91.00 |
| 50% Lecithin/50% Terpineol | 7.20–8.8. |

19. A method according to claim 1, further including the step of applying a patterned sheet of conductive material to the back panel to form electrode structures.

20. A method of forming a back panel for a plasma display device, the back panel including a metal core having a predetermined thermal coefficient of expansion (TCE) and a ceramic barrier rib structure which defines a plurality of channels, each channel containing a respective electrode, the method comprising the steps of:

preparing a green ceramic tape for a ceramic which has a thermal coefficient of expansion (TCE) which matches the TCE of the metal core;

printing electrode structures on to the green ceramic tape, the printed electrode structures being wider than the respective channels;

laminating the green ceramic tape to the metal core;

embossing the laminated green tape to form the barrier ribs on the green ceramic tape, the embossing step also acting to electrically isolate the printed electrode structures in the respective channels defined by the barrier ribs;

cofiring the bonded formed green ceramic tape and metal core to form the back panel.

21. A method of forming a back panel for a plasma display device according to claim 20, wherein the step of printing electrode structures on to the green ceramic tape includes the step of covering approximately 75% to 80% of an active area of the plasma display device with a conductive ink.

22. A method of forming a back panel for a plasma display device according to claim 20 wherein the step of printing electrode structures on the green ceramic tape includes the step of applying a conductive ink as a blanket coat within an active display area of the plasma display device.

23. A method of forming a back panel for a plasma display device according to claim 20, wherein the step of printing electrode structures on the green ceramic tape includes the step of preparing a conductive ink including a component that is brittle at temperatures at which the embossing step is performed, and printing the electrode structures using the conductive ink, whereby portions of the printed conductive ink break during the embossing step to electrically isolate the printed electrode structures in the respective channels defined by the barrier ribs.

24. A method of forming a back panel for a plasma display device according to claim 23 wherein the step of printing electrode structures on the green ceramic tape includes the step of preparing a conductive ink having a formulation defined by percent weight as:

| | |
|---|---|
| Ag Powder (particle size approximately 7.6 μm (~7.6 μm)) | 87.00–84.30 |
| Cu Powder (~2.3 μm) | 0.50–0.80 |
| 15% Isobutyl methacrylate in Terpineol | 11.50–13.50 |
| 50% Lecithin/50% Terpineol | 1.00–1.40; and | applying the conductive ink to the ceramic green tape as the printed electrode structures.

25. A method of forming a back panel for a plasma display device according to claim 23 wherein the step of printing electrode structures on the green ceramic tape includes the step of preparing a conductive ink having a formulation defined by percent weight as:

| | |
|---|---|
| Ag Powder (particle size approximately 0.1 μm (~0.1 μm)) | 85.23 |
| Cu Powder (~2.3 μm) | 0.71 |
| 15% Isobutyl methacrylate in Terpineol | 12.78 |
| 50% Lecithin/50% Terpineol | 1.28; and | applying the conductive ink to the ceramic green tape as the printed electrode structures.

26. A method of forming a back panel for a plasma display device according to claim 20, further including the step of soaking the green tape in solvent before printing the electrode structures on to the green tape.

* * * * *